Dec. 5, 1961     J. F. BARNES ET AL     3,011,933
FOIL-COVERED ELONGATED MEMBER
Filed Feb. 12, 1957
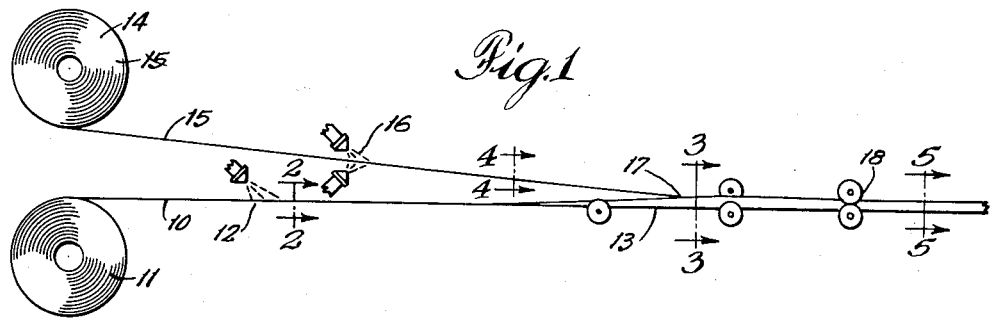
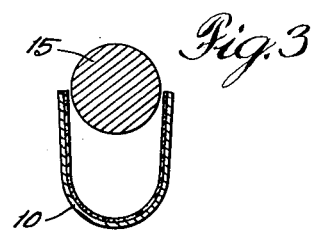
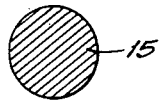
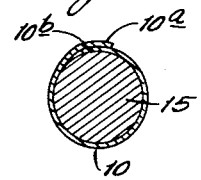
INVENTORS:
James F. Barnes
and Herman I. Silversher,
BY Dawson, Tilton, Fallon & Lungmus,
ATTORNEYS.

United States Patent Office 3,011,933
Patented Dec. 5, 1961

3,011,933
FOIL-COVERED ELONGATED MEMBER

James F. Barnes, Van Nuys, and Herman I. Silversher, Tujunga, Calif., assignors to Foil Process Corporation, Van Nuys, Calif., a corporation of California
Filed Feb. 12, 1957, Ser. No. 639,756
2 Claims. (Cl. 156—201)

This invention relates to a foil-covered elongated member and a method for producing the same, and more particularly, to a foil-covered elongated member in the form of a wire or tube having an external straight line, longitudinal seam.

A definite problem exists in the production of elongated members such as wires or pipes, particularly where such members are exposed to extreme weather conditions as might be encountered in use out-of-doors. Wire, for example, becomes corroded. To prevent corrosion, it is possible to use corrosion-resistant wire. However, the cost of providing a wire constructed entirely of corrosion-resistant material is usually prohibitive. One solution to this problem is to cover the wire with a thin covering of a corrosion-resistant material. The main body of the wire is thereby protected and can be constructed of a much less expensive material. A covering material proposed in the past has been aluminum foil. Conventionally, this foil has been provided in a long strip and spirally wound about the wire or tube to be protected. While helping to solve one problem, this method introduces another. The covering material, being of a dissimilar nature, generally has a different coefficient of thermal expansion from the core material. During changes of temperature, the covering and the core expand or contract in differing amounts. The difference in change of length of the two materials may loosen the bond between them and permit the very corrosion to take place that the covering is intended to prevent.

It is an object of our invention to provide a new form of a foil-covered elongated member and a method of producing the same. Another object is to provide a new form of foil-covered elongated member and a method of producing the same which is characterized by having a straight line, longitudinally extending outer seam. Another object is to provide a new form of foil-covered elongated member in which the foil provides useful properties not found in the elongated member. Other objects and advantages of our invention will be seen as this specification proceeds.

In one embodiment of our invention we form a foil-covered elongated member by enveloping the member in a foil sheet having a length approximately that of the member and a width not less than the circumference of the member. When the elongated member is enveloped, the foil sheet outer covering is characterized by having a straight line, longitudinal seam. The elongated members which may be enveloped according to our invention include a wide variety of cross-sectional shapes. Preferably, we employ tubes or wires since the circular cross-section permits a tight bond to be achieved between the foil sheet and the elongated member through the use of a metal bonding adhesive. The elongated members may be constructed of any material considered useful for the particular application contemplated. Where, for example, the intended usage must be accompanied by high tensile strength, we prefer to use a steel elongated member. The foil covering likewise can be selected from a variety of metal foil sheets. Such sheets may include aluminum foil, stainless steel foil, copper foil and the like. We have achieved very satisfactory results by covering steel wire with aluminum foil.

Our invention will be explained in conjunction with the accompanying drawing, in which—

FIGURE 1 is a diagrammatic flow sheet showing the production of foil-covered products in accordance with this invention; FIGURE 2 is a cross-sectional view taken along the lines 2—2 of FIGURE 1; FIGURE 3 is a cross-sectional view taken along line 3—3 of FIGURE 1; FIGURE 4 is a cross-sectional view taken along the line 4—4 of FIGURE 1; and FIGURE 5 is a cross-sectional view taken along the line 5—5 of FIGURE 1.

Referring now to the drawing, a foil sheet 10 is unwound from a reel 11 and conveyed past an adhesive applicator station 12. At station 12 an adhesive coating is applied to the upper surface of foil sheet 10. At this point the foil sheet has a cross-section of the shape shown in FIGURE 2 where the foil sheet is seen to be essentially flat.

From the adhesive-applying station 12, the foil sheet is conveyed to a forming station 13. Here a plurality of forming rolls are employed to shape the foil sheet into a generally tubular element having a U-shaped cross-section, such as is pictured in FIGURE 3.

Referring again to FIGURE 1, it is to be noted that a second reel is positioned above reel 11. The second reel, designated 14, carries the elongated member which is to be coated with foil. In the embodiment pictured, reel 14 carries wire 15. Shown positioned in the path of wire 15 issuing from reel 14 is a second adhesive applicator station designated 16. It is possible to apply adhesive to wire 15 through the use of station 16, if desired. The cross-section of wire 15 as it passes through applicator station 16 is shown in FIGURE 4.

Wire 15 is joined with the formed foil sheet after the formed foil sheet 10 issues from the forming station 13, the joinder being indicated by the numberal 17 in FIGURE 1. The united wire 15 and foil sheet 10 then pass to a second forming station 18 where the upper arm portions of foil sheet 10 are brought together to form a concentric covering over wire 15. In the embodiment pictured, the width of sheet 10 is greater than the circumference of wire 15 so that the edges 10a and 10b of foil sheet 10 are mated in a lap joint such as shown in FIGURE 5.

The lap joint construction pictured can be employed where the coefficient of expansion of wire 15 is greater than that of foil sheet 10. The greater expansion in wire 15 will not result even in partial exposure since the overlapping portions of foil sheet 10, as shown, will still overlap to some extent.

After the completion of the forming operation it is preferred to pass the foil-covered elongated member through a curing oven before it is passed to product storage or shipment.

Any thin, flexible metal foil can be used for the purpose of this invention, although aluminum foil is preferred. For example, stainless steel foil or copper foil might be substituted for aluminum where the intended usage dictates the employment of such coverings. The foil sheets can range in thickness from .00035 to .005 inch.

Various adhesive materials can be employed while still achieving some of the advantages of this invention. Generally the adhesive should be selected for its capacity to form a strong bond with metals and particularly with aluminum. Suitable adhesives for some purposes include those falling within the classes of thermosetting resin adhesives, thermoplastic resin adhesives, and elastomeric adhesives. The thermosetting resin adhesives are preferred, and particularly the epoxy resin adhesives. Epoxy resin adhesives upon first application and when only partially cured, are flexible and resilient, while being curable by the application of heat to a condition of increased rigidity. Moreover, such adhesives function as good bonding agents whether they are completely cured to a rigid infusible condition or not. A wide range of properties can be achieved with regard to the product either in its final condition or for intermediate processing operations.

The epoxy resin adhesives can be applied in the form of liquids, solvent solutions, or for short periods of time as hot solutions (melts), or melted B-staged powders. The adhesive shown being applied in FIG. 1 is a solvent solution. When the adhesive is used in the form of a solvent solution, the components of the adhesive can be dissolved in a suitable solvent solution, and this solution applied to the foil.

The advantages of using an epoxy resin include excellent adhesion to clean metal surfaces without complicated surface preparations. The hardening (or polymerization) mechanism is one of addition rather than condensation. This means that no by-products are formed to interrupt the long chain formations. These by-products could be manifested in the formation of gaseous pockets. Pressure must be employed to prevent this in coverings using condensation polymerized products, while only a minimum of contact pressure is adequate to produce a good epoxy film. Another advantage of this mechanism is the low shrinkage factor that does not tend to distort the desired structural dimensions.

One particularly suitable adhesive consists of the reaction product of an epoxy resin and a polyamide. These components can be heated individually to a temperature of 90 to 100° C. to soften them, then mixed and applied. Reaction betwen the two components gives a cross-linked polymer having characteristics of hardness and flexibility and curing time which vary with the mixing proportions and temperature of curing. The epoxy resins and the polyamide components can be of the type shown in Renfrew et al., Patent No. 2,705,223. Usually about a 50–50 mixture of epoxy resin and polyamide gives good results. These components can be dissolved in a methylethyl ketone, toluene, xylene, or comparable solvents for application as solvent solutions. Among the commercially available epoxy resin adhesives which may be mentioned are the Epon adhesives VI and VII of Shell Chemical, and the Araldite adhesivse AN–101 and AN–104 of Ciba. However, the preferred adhesives for this invention are not limited to those prepared from the interaction of epoxy resins and polyamides. They may also be made by reacting epoxy resins with amine hardeners and crosslinking agents. These in the main are polyamines of various molecular weight such as ethylenediamine, phenylenediamines, etc. Mixtures of polyamines and diamines can also be used.

Thermosetting resin adhesives of the characteristic described are quite desirable for the purposes of this application. However, as indicated, for some applications thermosetting resin adhesives or elastomeric adhesives might be used. Such adhesives are usually either flexible or rigid upon application, and lack the range of flexibility-hardness properties of epoxy resin adhesives. For example, rubber base adhesives remain flexible, while thermoplastic resin adhesives like polystyrene adhesives are rigid at normal temperaures, although softening upon the application of heat. Further, such adhesives are normally unstable in the higher temperature regions, say in excess of 200° F. Some resins, however, such as the phenolic resins, are useful for increasing heat resistance and dimensional stability of the formed products under heat. Epoxy resins containing amine hardeners have improved stability to heat, while those containing polyamides have better low temperature flexibility characteristics.

The preference for epoxy resin adhesives, as indicated above, is based in part on the range of properties obtainable with these adhesives. By combining the epoxy resins with the long chained polyamides in various proportions, the flexibility of the adhesives can be changed over a considerable range. For example, a mixture of epoxy resin like Epon 828 (Shell Chemical Co.) with Polyamide 115 (General Mills) in approximately equal proportions yields an adhesive of good flexibility when applied and which remains flexible until heat cured. The inclusion of low molecular weight hardeners, like ethylenediamine in amounts up to 10% by weight of the mixture, tends to reduce the flexibility of the adhesive. Additional modifying resins can also be included. These include such modifiers as elastomeric materials like Thiokol LP3 (American Cyanamid). Inert fillers may also be used for various purposes. Fillers like calcium carbonate, aluminum oxide, and aluminum powder increase hte rigidity and decrease the shrinkage of the adhesive layer. The metal powder increases the heat transfer. Fillers like asbestos or glass fibers can be used. Asbestos fibers would increase the heat resistance, while the glass layers would increase the strength of the adhesive layer. Other types of fillers or inner layers can also be used, such as resin-impregnated cloth, paper, etc. Where the elongated member is intended to be an electrical conductor, it may be desirable either to increase or decrease the heat transmission characteristic of the adhesive. Through the practice of our invention, such choice is available as indicated above.

As specific examples of the production of a foil-covered wire and tube by the practice of this invention, the following can be set forth.

*Example I*

A reel of 3/16 inch diameter black steel wire was provided. Also provided was a reel of .003 inch thick hard aluminum foil. The foil was in the form of a ribbon having a width of about 0.75 inch. The foil ribbon was coated with adhesive on only one side and sent through the first forming station 13. The black steel wire was fed into the formed foil ribbon and the united elements further formed to provide a foil-covered wire of the character shown in FIGURE 5. Later the foil-covered wire was heated at 300° F. for ten minutes to achieve the optimum physical properties. The adhesive used was an epoxy resin adhesive prepared by mixing a solution in equal parts of General Mills Polyamide 115 with Shell Epon 1001.

*Example II*

The procedure of Example I was followed, employing the same adhesive but using a 1/8 inch diameter galvanized steel wire and a .004 inch copper foil ribbon having a width of about .5 inch.

*Example III*

To provide a foil-covered pipe hiving good resistance to corrosion but not subject to widely varying temperatures, a 10-foot length of 1/4 inch black iron pipe was provided. A 10-foot length of .002 inch thick annealed aluminum foil having a width of 1.70 inches was also provided. The foil was coated with a 1 mil thickness of adhesive formulated as follows: 60 parts by weight of Epon 1001 was dissolved in 30 parts of toluol and 30 parts of methylethyl ketone. The second mixture was formed from 32 parts of Polyamide 115, 11 parts toluol and 3 parts butanol. 120 parts of the first mixture combined with 46 parts of the second mixture formed an epoxy resin adhesive solution containing 55.4% solids. This adhesive was used as formed, but it is to be noted that it can be thinned to a different consistency with a mixture of 5 parts toluol and 1 part butanol. The higher percentage epoxy resin provides a more rigid coating. The coated foil was then wrapped around the iron pipe with the edges of the foil meeting in abutting relation, and the assembly was then cured by passing it through a curing oven where it was maintained at 300° C. for ten minutes.

While in the foregoing specification this invention has been described in relation to specific embodiments and many details have been set forth for the purpose of illustration, it will be apparent to those skilled in the art

We claim:
1. In a method of ensheathing an elongated metal member, the steps of coating one face of a strip of foil with about a .001 inch thick layer of an epoxy amide resin metal-bonding adhesive, said foil being constructed of a metal other than that of which said member is constructed, said foil having a thickness in the range of .00035 inch to .005 inch, deforming said foil about said member with the longitudinal dimensions of each in aligned relation, and curing the adhesive to a condition of increased rigidity.

2. In a method of encasing an elongated metal member, the steps of coating one face of a strip of foil with about a .001 inch thick layer of an epoxy amide resin metal-bonding adhesive, said foil being constructed of a metal other than that of which the said member is constructed and being substantially resistant to corrosion when exposed to atmospheric conditions, said foil having a thickness in the range of .00035 inch to .005 inch, forming said foil into an elongated tube having a U-shaped cross-section, introducing said elongated member into said tube, bringing the arm portions of said U-shaped member together to cover the periphery of said elongated member, and curing the adhesive to a rigid condition in the assembled structure.

References Cited in the file of this patent

UNITED STATES PATENTS

| | | |
|---|---|---|
| 441,884 | Meyer | Dec. 2, 1890 |
| 460,920 | Meyer | Oct. 6, 1891 |
| 1,987,605 | Croasdale et al. | Jan. 15, 1935 |
| 2,063,470 | Staples | Dec. 8, 1936 |
| 2,088,446 | Specht | July 27, 1937 |
| 2,110,565 | Yeager | Mar. 8, 1938 |
| 2,566,513 | Bischoff | Sept. 4, 1951 |
| 2,682,515 | Naps | June 29, 1954 |
| 2,705,223 | Renfrew et al. | Mar. 29, 1955 |